US 8,423,987 B2

(12) United States Patent
Archer et al.

(10) Patent No.: US 8,423,987 B2
(45) Date of Patent: Apr. 16, 2013

(54) ROUTING PERFORMANCE ANALYSIS AND OPTIMIZATION WITHIN A MASSIVELY PARALLEL COMPUTER

(75) Inventors: Charles Jens Archer, Rochester, MN (US); Amanda Peters, Rochester, MN (US); Kurt Walter Pinnow, Rochester, MN (US); Brent Allen Swartz, Chippewa Falls, WI (US)

(73) Assignee: International Business Machines Corporation, Armonk, NY (US)

( * ) Notice: Subject to any disclaimer, the term of this patent is extended or adjusted under 35 U.S.C. 154(b) by 1832 days.

(21) Appl. No.: 11/668,691

(22) Filed: Jan. 30, 2007

(65) Prior Publication Data
US 2008/0184214 A1 Jul. 31, 2008

(51) Int. Cl.
*G06F 9/45* (2006.01)

(52) U.S. Cl.
USPC ............ 717/158; 717/151; 717/153; 717/154

(58) Field of Classification Search .................... None
See application file for complete search history.

(56) References Cited

U.S. PATENT DOCUMENTS

| | | | |
|---|---|---|---|
| 5,050,162 A | 9/1991 | Golestani | |
| 5,218,676 A | 6/1993 | Ben-Ayed et al. | |
| 5,319,638 A | 6/1994 | Lin | |
| 5,347,450 A | 9/1994 | Nugent | |
| 5,414,849 A * | 5/1995 | Yamamoto | 717/149 |
| 5,453,978 A | 9/1995 | Sethu et al. | |
| 5,835,482 A | 11/1998 | Allen | |
| 5,933,425 A | 8/1999 | Iwata | |
| 5,959,995 A | 9/1999 | Wicki et al. | |
| 6,081,506 A | 6/2000 | Buyukkoc et al. | |
| 6,486,983 B1 | 11/2002 | Beshai et al. | |
| 6,748,413 B1 | 6/2004 | Bournas | |
| 6,901,052 B2 | 5/2005 | Buskirk et al. | |
| 7,319,695 B1 | 1/2008 | Agarwal et al. | |
| 2004/0001508 A1 | 1/2004 | Zheng et al. | |
| 2005/0002334 A1 | 1/2005 | Chao et al. | |
| 2005/0018682 A1 | 1/2005 | Ferguson et al. | |
| 2005/0068946 A1 | 3/2005 | Beshai | |
| 2005/0100035 A1 | 5/2005 | Chiou et al. | |
| 2005/0108425 A1 | 5/2005 | Rabinovitch | |
| 2006/0002424 A1 | 1/2006 | Gadde | |
| 2006/0195336 A1 | 8/2006 | Greven et al. | |
| 2008/0016249 A1 | 1/2008 | Ellis et al. | |

OTHER PUBLICATIONS

Ribler et al. "The Autopilot performance-directed adaptive control system", 2001, Elsevier Science.*

(Continued)

*Primary Examiner* — Lewis A Bullock, Jr.
*Assistant Examiner* — Mark Gooray
(74) *Attorney, Agent, or Firm* — Wood, Herron & Evans, LLP

(57) ABSTRACT

An apparatus, program product and method optimize the operation of a massively parallel computer system by, in part, receiving actual performance data concerning an application executed by the plurality of interconnected nodes, and analyzing the actual performance data to identify an actual performance pattern. A desired performance pattern may be determined for the application, and an algorithm may be selected from among a plurality of algorithms stored within a memory, the algorithm being configured to achieve the desired performance pattern based on the actual performance data.

18 Claims, 5 Drawing Sheets

OTHER PUBLICATIONS

U.S. Appl. No. 11/539,248, entitled "Method and Apparatus for Routing Data in an Inter-Nodal Communications Lattice of a Massively Parallel Computer System by Dynamic Global Mapping of Contended Links," filed Oct. 6, 2006 by Charles Jens Archer et al.

U.S. Appl. No. 11/539,270, entitled "Method and Apparatus for Routing Data in an Inter-Nodal Communications Lattice of a Massively Parallel Computer System by Semi-Randomly Varying Routing Policies for Different Packets," filed Oct. 6, 2006 by Charles Jens Archer et al.

U.S. Appl. No. 11/539,300, entitled "Method and Apparatus for Routing Data in an Inter-Nodal Communications Lattice of a Massively Parallel Computer System by Routing Through Transporter Nodes," filed Oct. 6, 2006 by Charles Jens Archer et al.

U.S. Appl. No. 11/539,329, entitled "Method and Apparatus for Routing Data in an Inter-Nodal Communications Lattice of a Massively Parallel Computer System by Dynamically Adjusting Local Routing Strategies," filed Oct. 6, 2006 by Charles Jens Archer et al.

U.S. Appl. No. 11/531,175, entitled "Performing Process Migration with AllReduce Operations," filed Sep. 12, 2006 by Charles Jens Archer et al.

Ribler, Randy L et al, "The Autopilot performance-directed adaptive control system", Future Generations Computer Systems, Elsevier Science Publishers, Amsterdam, NL, vol. 18, No. 1, Sep. 1, 2001, pp. 175-187.

Zhang, Yan et al, "Automatic Performance Tuning for J2EE Application Server Systems", Lecture Notes in Computer Science, vol. 3806, 2005, pp. 520-527.

Chung, I-Hsin et al, "Automated cluster-based web service performance tuning", High Performance Distributed Computing, 2004, Proceedings of the 13th IEEE International Symposium on Honolulu, HI, USA, Jun. 4-6, 2004, Piscataway, NJ, USA, IEEE, Jun. 4, 2004, pp. 36-44.

Hondroudakis, Anna et al, "An Empirically Derived Framework for Classifying Parallel Program Performance Tuning Problems", Proceedings of the Sigmetrics Symposium on Parallel and Distributed Tools, SPDT 1998, Welches, OR, Aug. 3-4, 1998, Sigmetrics Symposium on Parallel and Distributed Tools, New York, NY, US, ACM, vol. SYMP.2, Aug. 3, 1998, pp. 112-123.

* cited by examiner

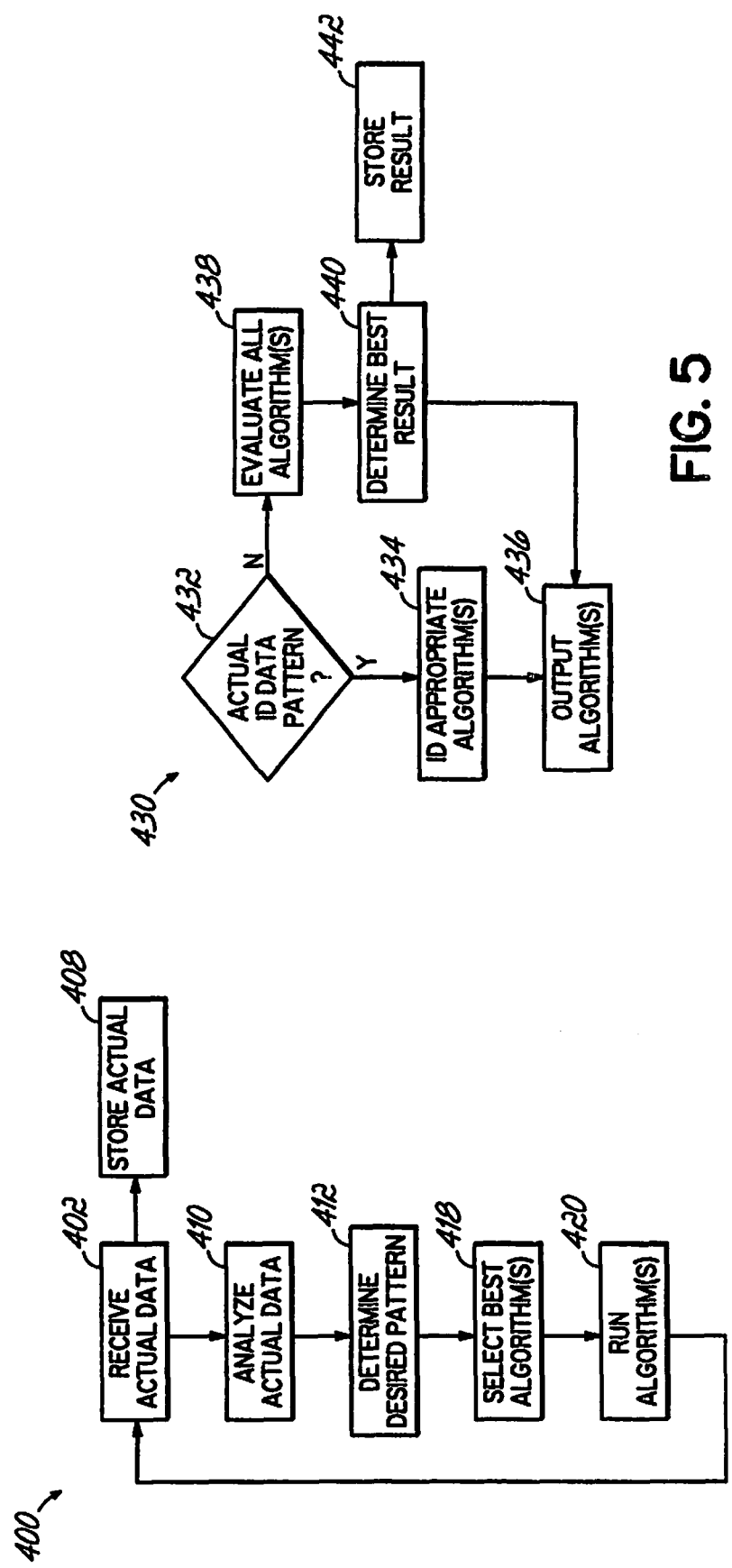

ROUTING PERFORMANCE ANALYSIS AND OPTIMIZATION WITHIN A MASSIVELY PARALLEL COMPUTER

STATEMENT REGARDING FEDERALLY SPONSORED RESEARCH OR DEVELOPMENT

This invention was made with Government support under Contract No. B519700 awarded by the Department of Energy. The Government has certain rights in this invention.

FIELD OF THE INVENTION

The invention is generally directed to computers and computer software, and in particular, to the analysis and optimization of computer programs.

BACKGROUND OF THE INVENTION

Computer technology has continued to advance at a remarkable pace, with each subsequent generation of a computer system increasing in performance, functionality and storage capacity, and often at a reduced cost. A modern computer system typically comprises one or more central processing units (CPU) and supporting hardware necessary to store, retrieve and transfer information, such as communication buses and memory. A modern computer system also typically includes hardware necessary to communicate with the outside world, such as input/output controllers or storage controllers, and devices attached thereto such as keyboards, monitors, tape drives, disk drives, communication lines coupled to a network, etc.

From the standpoint of the computer's hardware, most systems operate in fundamentally the same manner. Processors are capable of performing a limited set of very simple operations, such as arithmetic, logical comparisons, and movement of data from one location to another. But each operation is performed very quickly. Sophisticated software at multiple levels directs a computer to perform massive numbers of these simple operations, enabling the computer to perform complex tasks. What is perceived by the user as a new or improved capability of a computer system is made possible by performing essentially the same set of very simple operations, but doing it much faster, and thereby enabling the use of software having enhanced function. Therefore continuing improvements to computer systems require that these systems be made ever faster.

The overall speed of a computer system (also called the throughput) may be crudely measured as the number of operations performed per unit of time. Conceptually, the simplest of all possible improvements to system speed is to increase the clock speeds of the various components, and particularly the clock speed of the processor(s). E.g., if everything runs twice as fast but otherwise works in exactly the same manner, the system will perform a given task in half the time. Enormous improvements in clock speed have been made possible by reduction in component size and integrated circuitry, to the point where an entire processor, and in some cases multiple processors along with auxiliary structures such as cache memories, can be implemented on a single integrated circuit chip. Despite these improvements in speed, the demand for ever faster computer systems has continued, a demand which can not be met solely by further reduction in component size and consequent increases in clock speed. Attention has therefore been directed to other approaches for further improvements in throughput of the computer system.

Without changing the clock speed, it is possible to improve system throughput by using a parallel computer system incorporating multiple processors that operate in parallel with one another. The modest cost of individual processors packaged on integrated circuit chips has made this approach practical. Although the use of multiple processors creates additional complexity by introducing numerous architectural issues involving data coherency, conflicts for scarce resources, and so forth, it does provide the extra processing power needed to increase system throughput, given that individual processors can perform different tasks concurrently with one another.

Various types of multi-processor systems exist, but one such type of system is a massively parallel nodal system for computationally intensive applications. Such a system typically contains a large number of processing nodes, each node having its own processor or processors and local (nodal) memory, where the nodes are arranged in a regular matrix, or lattice structure. The system contains a mechanism for communicating data among different nodes, a control mechanism for controlling the operation of the nodes, and an I/O mechanism for loading data into the nodes from one or more I/O devices and receiving output from the nodes to the I/O device (s). In general, each node acts as an independent computer system in that the addressable memory used by the processor is contained entirely within the processor's local node, and the processor has no capability to directly reference data addresses in other nodes. However, the control mechanism and I/O mechanism are shared by all the nodes.

A massively parallel nodal system such as described above is a general-purpose computer system in the sense that it is capable of executing general-purpose applications, but it is designed for optimum efficiency when executing computationally intensive applications, i.e., applications in which the proportion of computational processing relative to I/O processing is high. In such an application environment, each processing node can independently perform its own computationally intensive processing with minimal interference from the other nodes. In order to support computationally intensive processing applications which are processed by multiple nodes in cooperation, some form of inter-nodal data communication matrix is provided. This data communication matrix supports selective data communication paths in a manner likely to be useful for processing large processing applications in parallel, without providing a direct connection between any two arbitrary nodes. Optimally, I/O workload is relatively small, because the limited I/O resources would otherwise become a bottleneck to performance.

An exemplary massively parallel nodal system is the IBM Blue Gene®/L (BG/L) system. The BG/L system contains many (e.g., in the thousands) processing nodes, each having multiple processors and a common local (nodal) memory, and with five specialized networks interconnecting the nodes for different purposes. The processing nodes are arranged in a logical three-dimensional torus network having point-to-point data communication links between each node and its immediate neighbors in the network. Additionally, each node can be configured to operate either as a single node or multiple virtual nodes (one for each processor within the node), thus providing a fourth dimension of the logical network. A large processing application typically creates one or more blocks of nodes, herein referred to as communicator sets, for performing specific sub-tasks during execution. The application may have an arbitrary number of such communicator sets, which may be created or dissolved at multiple points during application execution. The nodes of a communicator set typically comprise a rectangular parallelopiped of the three-dimensional torus network.

The hardware architecture supported by the BG/L system and other massively parallel computer systems provides a tremendous amount of potential computing power, e.g., petaflop or higher performance. Furthermore, the architectures of such systems are typically scalable for future increases in performance. However, unless the software applications running on the hardware architecture operate efficiently, the overall performance of such systems can suffer.

As an example, BG/L system performance can be hindered by various conditions. Communication bottlenecks between nodes can result from poor network utilization or ported code. Other problems may be attributable to incorrect assumptions about communication nodal matrix geometries. For instance, a designated path between nodes may be longer than it should be, resulting in a load imbalance or link contention. Poor performance may likewise result from cache misses and/or temperature-related problems.

It is consequently incumbent upon system designers and administrators to locate and fix such problems. Conventional automated programs available to programmers typically address a problematic link or node, singularly, and cannot affect communications on large, comprehensive scale. Since most identifiable performance problems are systemic of communication problems affecting other links and nodes of a matrix network, programmers are generally relegated to manually addressing problems on any large scale notion.

In part to assist in this task, the BG/L supports a message-passing programming library, known as the Message Passing Interface (MPI). The MPI generates reports that can be analyzed to determine bottlenecks, temperature-related problems, link contention and cache misses, among other conditions. Programmers will conventionally evaluate such reports before manually selecting an appropriate communications algorithm. The selected algorithm is then applied to the system, after which the results may be manually evaluated to see if improvement is achieved. As one can imagine, such a manual task demands significant time commitment from skilled personnel. Results can furthermore be relatively imprecise, largely relying on trial and error before the most efficient algorithm(s) can be identified and applied.

Therefore, a need exists for an improved manner of optimizing performance of a plurality of interconnected nodes of a parallel computer system.

SUMMARY OF THE INVENTION

The invention addresses these and other problems associated with the prior art in providing an apparatus, program product and method that optimize the performance of an application executed by a plurality of interconnected nodes comprising a massively parallel computer system by, in part, receiving actual performance data concerning the application executed by the plurality of interconnected nodes, and analyzing the actual performance data to identify an actual performance pattern. Embodiments may further determine a desired performance pattern for the application, and select an algorithm from among a plurality of algorithms stored within a memory. The selected algorithm is configured to achieve the desired performance pattern based on the actual performance data.

Consistent with an aspect of the invention, attempts to identify the actual performance pattern may comprise correlating the actual performance data to the actual performance pattern identified from among a plurality of actual performance patterns stored within the memory. If the actual performance pattern can be identified, the actual performance pattern may be used to select the algorithm. Where the actual performance pattern cannot be identified, an embodiment may sequence through the plurality of algorithms to determine the algorithm configured to best achieve the desired performance pattern based upon the actual performance data. In such a case, the algorithm may be stored within the memory in association with the actual performance data.

Consistent with another aspect of the invention, the selected algorithm comprises using fuzzy logic, or artificial intelligence. Moreover, the selected algorithm may be automatically applied to the operation of the massively parallel computer system.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 4 is a flowchart illustrating an exemplary process for automatically optimizing communication between the nodes of the massively parallel computer system of FIG. 1.

FIG. 5 is a flowchart illustrating an exemplary process for determining the algorithm configured to achieve the desired performance pattern in the context of the FIG. 4.

DETAILED DESCRIPTION

Figure 1:
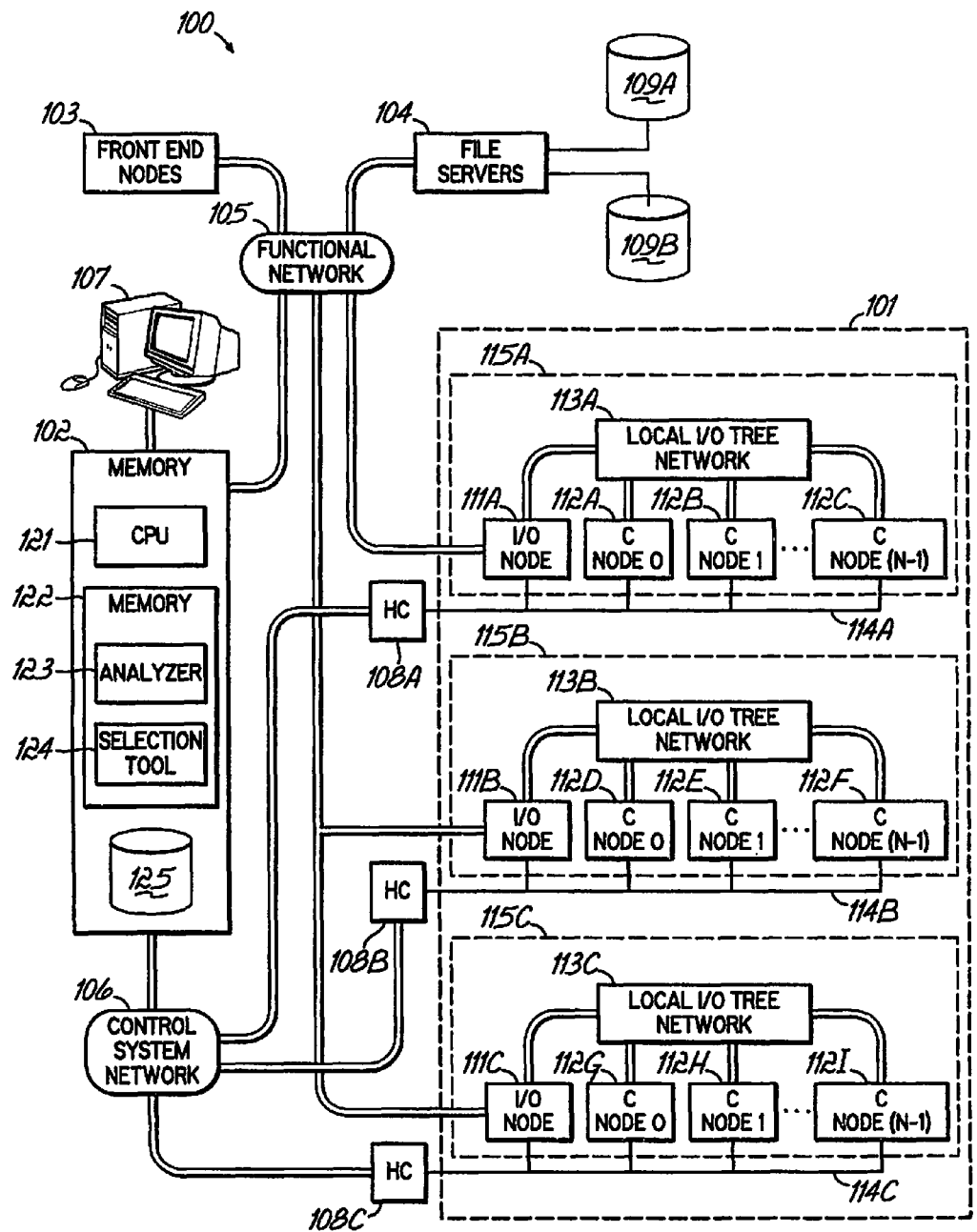
FIG. 1 is a high level block diagram of a massively parallel computer system incorporating functional implementation selection consistent with the invention.

The embodiments described hereinafter may use fuzzy logic, or artificial intelligence, to analyze actual performance data generated by a massively parallel computer system, and automatically select one or more algorithms configured to tune, or optimize performance. In certain embodiments, program code comprising the artificial intelligence may learn to identify patterns of actual performance data, and automatically select and apply algorithms to achieve desired system performance. In this manner, embodiments may automatically address problems by discovering performance enhancing techniques, and transparently adjusting an application's performance.

To implement automatic optimization of the system performance, embodiments may employ an internal or external programmatic agent configured to monitor the node properties. The program may use a service interface network, such as the JTAG network associated with the BG/L system. The program may detect problems, plan a solution, and then automatically implement an algorithmic solution, or rule. The algorithm(s) may be used to automatically improve performance, e.g., route around bad hardware. The algorithm(s) may further be applied to multiple problem domains. For example, the algorithm may be applied to routing around bad hardware, or adapting to network congestion at runtime without any intervention from the user.

In the illustrated embodiments, program code may use a three step approach to solving the problem of network congestion or failure rerouting. The approach may include a programmatic agent that detects the congestion or failure, plans a solution, and subsequently steers, or optimizes, the application. The programmatic agent may be tightly integrated into the control system and may therefore be turned on or off, optionally. Embodiments consistent with the invention allow, for instance, a routing algorithm for messages to be altered dynamically at run time.

The programmatic agent typically has access to all CPU registers and performance counters, and will poll the nodes to assess present communication patterns. For instance, the agent may use the JTAG network to periodically monitor relevant properties of the node. The agent may be trained to recognize problems that could cause performance issues like network congestion, cache misses, temperature-related problems or excessive interrupts. For example, network congestion may be detected by the agent monitoring the message traffic counters while the application is running. The agent may accomplish this by utilizing known pattern recognition schemes. Upon finding a significant communication network imbalance, the agent may signal that an alternative routing schema should be invoked.

There are a variety of steps that may be taken when congested nodes are determined. For instance, the agent may include a rule-based cause and effect program to determine what congestion alleviation process to follow. For each possible solution, such as dynamic routing using transporter notes, or alternative static routing heuristics, there may be a known profile for its effect. The program/planner may be external to the system so it is able to calculate the optimization plan offline. By knowing the current status of the system and the location of the congested node or nodes, the agent may determine the effect that each routing algorithm would have. This works for other performance problems, as well, such as memory usage or cache patterns. By executing this plan, the agent may be able to determine the best solution for re-routing.

If a profile comprising the actual performance data, e.g., an actual performance pattern, is not known, and there is no known effect, the tool may simulate all of the combinations. A new, un-profiled application (un-associated with a known cause and effect rule base), may initiate the input of a library of known actions, or algorithms. As the application is running, the results from each algorithm retrieved from the library may be observed. This action may build a corresponding library of effects for the known causal actions. Furthermore, embodiments consistent with the invention may dynamically track synergistic effects between actions. For example, in a two causal effect (A, B), should A+B be determined to be undesirable), (A+B) may be flagged or otherwise designated as a negative combination. Alternatively two effects may double the performance, and so embodiments may flag those combinations as being good. In this manner, the agent may learn and create the rule base so that it may optimize performance. A report may be generated so that these performance enhancing features may be remembered for future use, and the library may be grown.

Based on the output of the plan, comprising the selected algorithm(s) associated with the actual performance data, the programmatic agent may begin to steer the application. For instance, the agent may invoke the desired routing algorithm (s) in one of several ways. These options may range from the use of global interrupts to alert the application that it must rerun its parameter set to dynamic process reconfiguration, to node swap via process migration, and to user interaction where the user is prompted for even a more intelligent configuration, which may be remembered and fed back to a plan. In order to alert each node of the algorithm switch, an alternative network, such as JTAG or Global Interrupt (GI) may be utilized. In some instances, an alternate network may be used to reset some key parameters, alert the nodes to start reading from a different configuration file, or even inject the new configuration file into the network.

Embodiments may allow the network congestion to be alleviated at runtime without any intervention from the user. Embodiments may continuously monitor the message traffic and shift communication patterns when necessary. This scheme may offer both on-the-fly monitoring and on-the-fly adjustment of communication routing algorithms.

Further details regarding the aforementioned applications will be described in greater detail below. Other modifications and enhancements to the embodiments described herein will also be apparent to one of ordinary skill in the art having the benefit of the instant disclosure.

Turning now to the Drawings, wherein like numbers denote like parts throughout the several views, FIG. 1 is a high-level block diagram of the major hardware components of an illustrative embodiment of a massively parallel computer system 100 consistent with the invention. In the illustrated embodiment, computer system 100 is an IBM Blue Gene®/L (BG/L) computer system, it being understood that other computer systems could be used, and the description of an illustrated embodiment herein is not intended to limit the present invention to the particular architecture described.

Computer system 100 includes a compute core 101 having a large number of compute nodes arranged in a regular array or matrix, which collectively perform the bulk of the useful work performed by system 100. The operation of computer system 100 including compute core 101 is generally controlled by control subsystem 102. Various additional processors included in front-end nodes 103 perform certain auxiliary data processing functions, and file servers 104 provide an interface to data storage devices such as rotating magnetic disk drives 109A, 109B or other I/O (not shown). Functional network 105 provides the primary data communications path among the compute core 101 and other system components. For example, data stored in storage devices attached to file servers 104 is loaded and stored to other system components through functional network 105.

Compute core 101 includes I/O nodes 111A-C (herein generically referred to as feature 111) and compute nodes 112A-I (herein generically referred to as feature 112). Compute nodes 112 are the workhorse of the massively parallel system 100, and are intended for executing compute-intensive applications which may require a large number of processes proceeding in parallel. I/O nodes 111 handle I/O operations on behalf of the compute nodes.

Each I/O node includes an I/O processor and I/O interface hardware for handling I/O operations for a respective set of N compute nodes 112, the I/O node and its respective set of N compute nodes being referred to as a Pset. Compute core 101 includes M Psets 115A-C (herein generically referred to as feature 115), each including a single I/O node 111 and N compute nodes 112, for a total of M×N compute nodes 112. The product M×N can be very large. For example, in one implementation M=1024 (1K) and N=64, for a total of 64K compute nodes.

In general, application programming code and other data input required by the compute core for executing user application processes, as well as data output produced by the compute core as a result of executing user application processes, is communicated externally of the compute core over functional network 105. The compute nodes within a Pset 115 communicate with the corresponding I/O node over a corresponding local I/O tree network 113A-C (herein generically referred to as feature 113). The I/O nodes in turn are attached to functional network 105, over which they communicate with I/O devices attached to file servers 104, or with other system components. Thus, the local I/O tree networks 113 may be viewed logically as extensions of functional network 105, and like functional network 105 are used for data I/O, although they are physically separated from functional network 105.

Control subsystem 102 directs the operation of the compute nodes 112 in compute core 101. Control subsystem 102 may be implemented, for example, as mini-computer system including its own processor or processors 121 (of which one is shown in FIG. 1), internal memory 122, and local storage 125, and having an attached console 107 for interfacing with a system administrator. Control subsystem 102 includes an internal database which maintains certain state information for the compute nodes in core 101, and a control application executing on the control subsystem's processor(s) which controls the allocation of hardware in compute core 101, directs the pre-loading of data to the compute nodes, and performs certain diagnostic and maintenance functions. Control subsystem desirably includes an analytical program 123 for performing more detailed analysis of functional implementations, as well as a selection tool 124 for generating selection program code for use in optimizing the selection of function implementations, both operating in a manner described in greater detail below. Control system 102 communicates control and state information with the nodes of compute core 101 over control system network 106. Network 106 is coupled to a set of hardware controllers 108A-C (herein generically referred to as feature 108). Each hardware controller communicates with the nodes of a respective Pset 115 over a corresponding local hardware control network 114A-C (herein generically referred to as feature 114). The hardware controllers 108 and local hardware control networks 114 may be considered logically as extensions of control system network 106, although they are physically separate. The control system network and local hardware control network typically operate at a lower data rate than the functional network 105.

In addition to control subsystem 102, front-end nodes 103 each include a collection of processors and memory that perform certain auxiliary functions which, for reasons of efficiency or otherwise, are best performed outside the compute core. Functions that involve substantial I/O operations are generally performed in the front-end nodes. For example, interactive data input, application code editing, or other user interface functions are generally handled by front-end nodes 103, as is application code compilation. Front-end nodes 103 are coupled to functional network 105 for communication with file servers 104, and may include or be coupled to interactive workstations (not shown).

Figure 2:
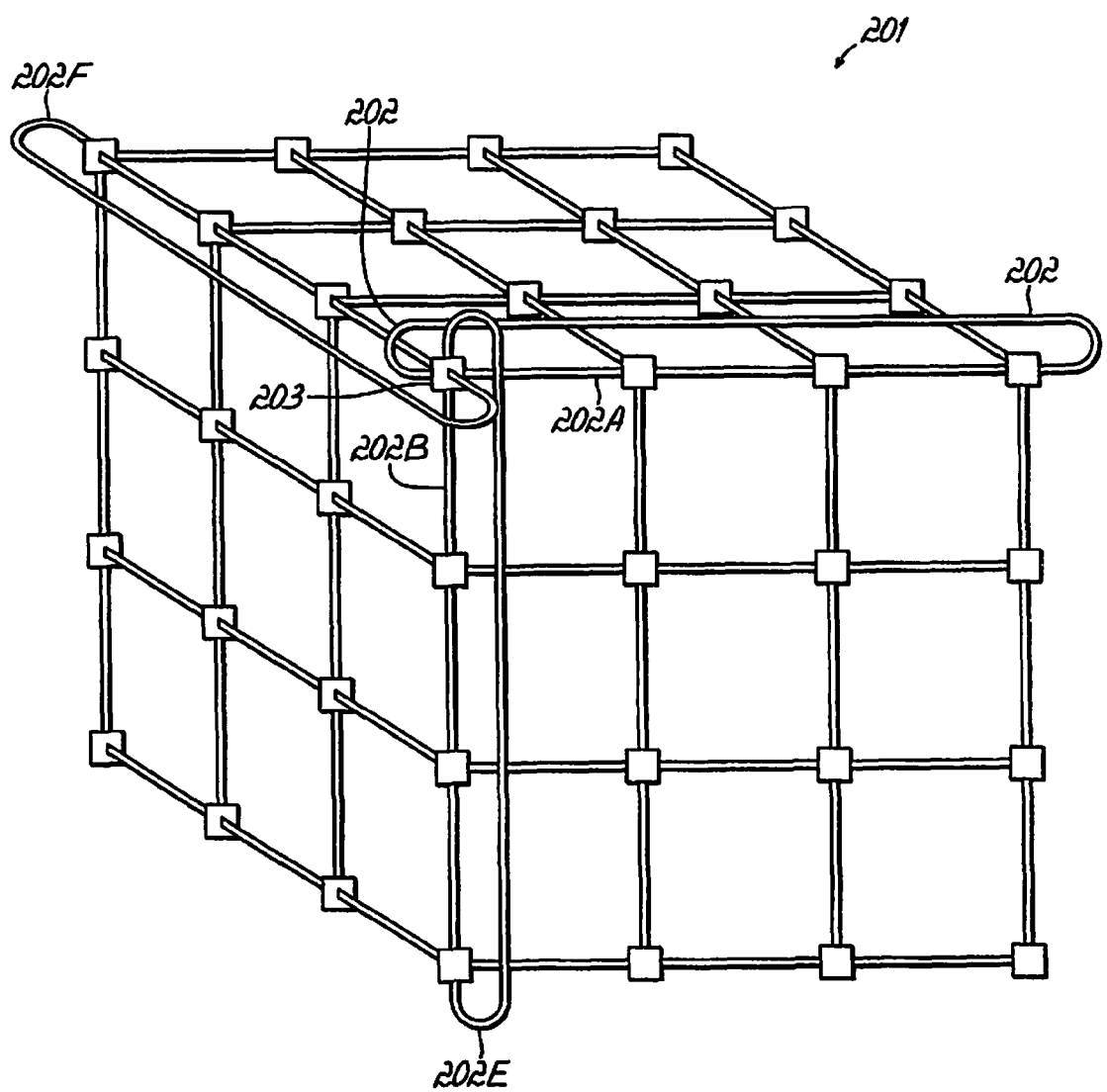
FIG. 2 is a simplified representation of a three dimensional lattice structure and inter-nodal communication network in the massively parallel computer system of FIG. 1.

Compute nodes 112 are logically arranged in a three-dimensional lattice, each compute node having a respective x, y and z coordinate. FIG. 2 is a simplified representation of the three dimensional lattice (also referred to as a mesh or torus) structure 201. Referring to FIG. 2, a simplified 4×4×4 lattice is shown, in which the interior nodes of the lattice are omitted for clarity of illustration. Although a 4×4×4 lattice (having 64 nodes) is represented in the simplified illustration of FIG. 2, it will be understood that the actual number of compute nodes in the lattice is typically much larger. Each compute node in lattice 201 includes a set of six node-to-node communication links 202A-F (herein referred to generically as feature 202) for communicating data with its six immediate neighbors in the x, y and z coordinate dimensions.

As used herein, the term "lattice" includes any regular pattern of nodes and inter-nodal data communications paths in more than one dimension, such that each node has a respective defined set of neighbors, and such that, for any given node, it is possible to algorithmically determine the set of neighbors of the given node from the known lattice structure and the location of the given node in the lattice. A "neighbor" of a given node is any node which is linked to the given node by a direct inter-nodal data communications path, i.e. a path which does not have to traverse another node. A "lattice" may be three-dimensional, as shown in FIG. 2, or may have more or fewer dimensions. The lattice structure is a logical one, based on inter-nodal communications paths. Obviously, in the physical world, it is impossible to create physical structures having more than three dimensions, but inter-nodal communications paths can be created in an arbitrary number of dimensions. It is not necessarily true that a given node's neighbors are physically the closest nodes to the given node, although it is generally desirable to arrange the nodes in such a manner, insofar as possible, as to provide physical proximity of neighbors.

In the illustrated embodiment, the node lattice logically wraps to form a torus in all three coordinate directions, and thus has no boundary nodes. E.g., if the node lattice contains dimx nodes in the x-coordinate dimension ranging from 0 to (dimx−1), then the neighbors of Node((dimx−1), y0, z0) include Node((dimx−2), y0, z0) and Node (0, y0, z0), and similarly for the y-coordinate and z-coordinate dimensions. This is represented in FIG. 2 by links 202D, 202E, 202F which wrap around from a last node in an x, y and z dimension, respectively to a first, so that node 203, although it appears to be at a "corner" of the lattice, has six node-to-node links 202A-F. It will be understood that, although this arrangement is an illustrated embodiment, a logical torus without boundary nodes is not necessarily a requirement of a lattice structure.

The aggregation of node-to-node communication links 202 is referred to herein as the torus network. The torus network permits each compute node to communicate results of data processing tasks to neighboring nodes for further processing in certain applications which successively process data in different nodes. However, it will be observed that the torus network includes only a limited number of links, and data flow is optimally supported when running generally parallel to the x, y or z coordinate dimensions, and when running to successive neighboring nodes. For this reason, applications requiring the use of a large number of nodes may subdivide computation tasks into blocks of logically adjacent nodes (communicator sets) in a manner to support a logical data flow, where the nodes within any block may execute a common application code function or sequence.

Figure 3:
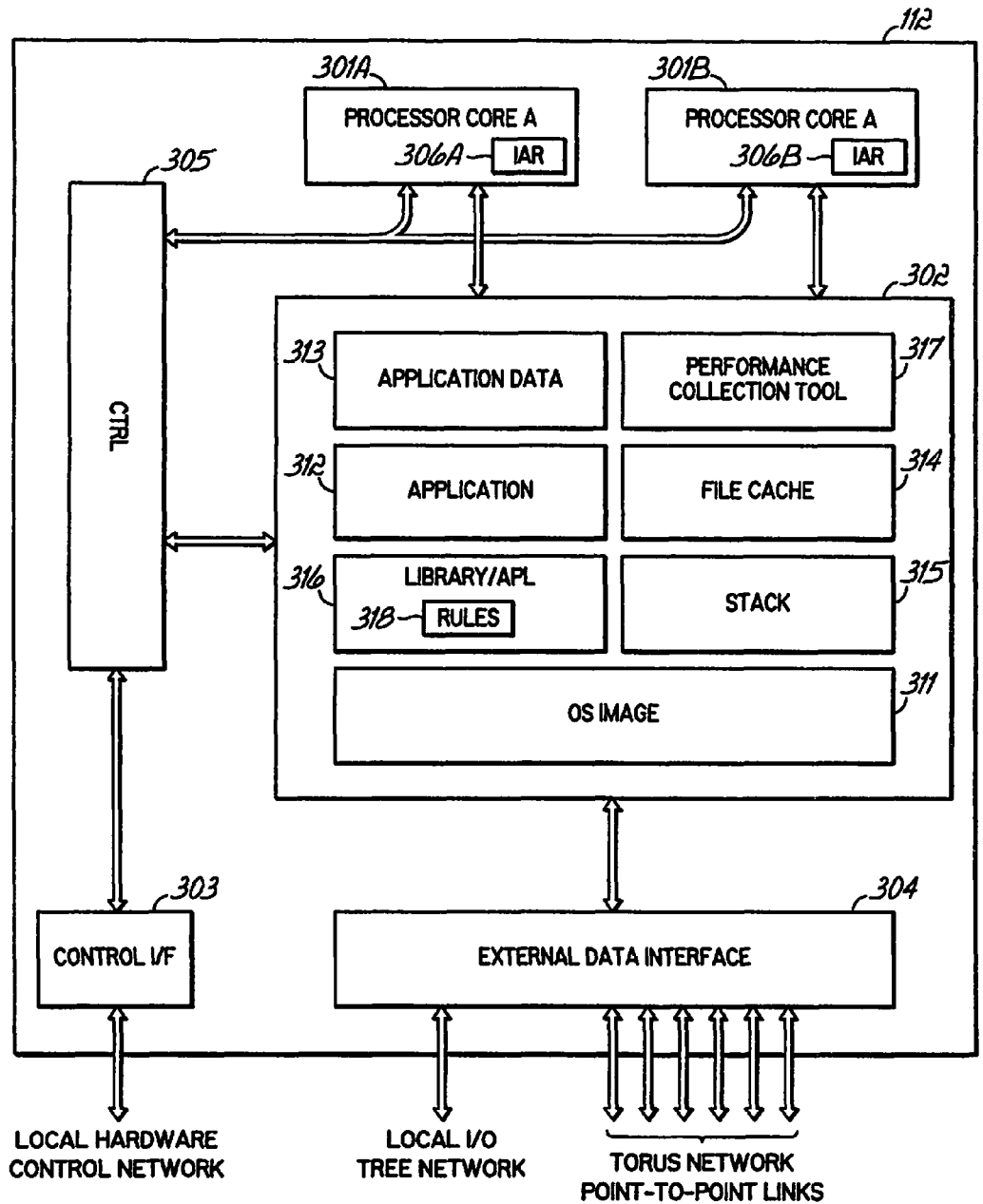
FIG. 3 is a high-level diagram of a compute node in the massively parallel computer system of FIG. 1.

FIG. 3 is a high-level block diagram of the major hardware and software components of a compute node 112 of computer system 100 configured in a coprocessor operating mode. It will be appreciated by one of ordinary skill in the art having the benefit of the instant disclosure that each compute node 112 may also be configurable to operate in a different mode, e.g., within a virtual node operating mode.

Compute nodes 112 include one or more processor cores 301A, 301B (herein generically referred to as feature 301), two processor cores being present in the illustrated embodiment, it being understood that this number could vary. Compute node 112 further includes a single addressable nodal memory 302 that is used by both processor cores 301; an external control interface 303 that is coupled to the corresponding local hardware control network 114; an external data communications interface 304 that is coupled to the corresponding local I/O tree network 113, and the corresponding six node-to-node links 202 of the torus network; and monitoring and control logic 305 that receives and responds to control commands received through external control interface 303. Monitoring and control logic 305 can access certain registers in processor cores 301 and locations in nodal memory 302 on behalf of control subsystem 102 to read or alter the state of node 112. In the illustrated embodiment, each node 112 is physically implemented as a respective single, discrete integrated circuit chip.

From a hardware standpoint, each processor core 301 is an independent processing entity capable of maintaining state for and executing threads independently. Specifically, each processor core 301 includes its own instruction state register or instruction address register 306A, 306B (herein generically referred to as feature 306) which records a current instruction being executed, instruction sequencing logic, instruction decode logic, arithmetic logic unit or units, data registers, and various other components required for maintaining thread state and executing a thread.

Each compute node can operate in either coprocessor mode or virtual node mode, independently of the operating modes of the other compute nodes. When operating in coprocessor mode, the processor cores of a compute node do not execute independent threads. Processor Core A 301A acts as a primary processor for executing the user application sub-process assigned to its node, and instruction address register 306A will reflect the instruction state of that sub-process, while Processor Core B 301B acts as a secondary processor which handles certain operations (particularly communications related operations) on behalf of the primary processor. When operating in virtual node mode, each processor core executes its own user application sub-process independently and these instruction states are reflected in the two separate instruction address registers 306A, 306B, although these sub-processes may be, and usually are, separate sub-processes of a common user application. Because each node effectively functions as two virtual nodes, the two processor cores of the virtual node constitute a fourth dimension of the logical three-dimensional lattice 201. Put another way, to specify a particular virtual node (a particular processor core and its associated subdivision of local memory), it is necessary to specify an x, y and z coordinate of the node (three dimensions), plus a virtual node (either A or B) within the node (the fourth dimension).

As described, functional network 105 services many I/O nodes, and each I/O node is shared by multiple compute nodes. It should be apparent that the I/O resources of massively parallel system 100 are relatively sparse in comparison with its computing resources. Although it is a general purpose computing machine, it is designed for maximum efficiency in applications which are compute intensive. If system 100 executes many applications requiring large numbers of I/O operations, the I/O resources will become a bottleneck to performance.

In order to minimize I/O operations and inter-nodal communications, the compute nodes are designed to operate with relatively little paging activity from storage. To accomplish this, each compute node includes its own complete copy of an operating system (operating system image) in nodal memory 302, and a copy of the application code being executed by the processor core. Unlike conventional multi-tasking system, only one software user application sub-process is active at any given time. As a result, there is no need for a relatively large virtual memory space (or multiple virtual memory spaces) which is translated to the much smaller physical or real memory of the system's hardware. The physical size of nodal memory therefore limits the address space of the processor core.

As shown in FIG. 3, when executing in coprocessor mode, the entire nodal memory 302 is available to the single software application being executed. The nodal memory contains an operating system image 311, an application code image 312, and user application data structures 313 as required. Some portion of nodal memory 302 may further be allocated as a file cache 314, i.e., a cache of data read from or to be written to an I/O file.

Operating system image 311 contains a complete copy of a simplified-function operating system. Operating system image 311 includes certain state data for maintaining process state. Operating system image 311 is desirably reduced to the minimal number of functions required to support operation of the compute node. Operating system image 311 does not need, and desirably does not include, certain of the functions normally included in a multi-tasking operating system for a general purpose computer system. For example, a typical multi-tasking operating system may include functions to support multi-tasking, different I/O devices, error diagnostics and recovery, etc. Multi-tasking support is typically unnecessary because a compute node supports only a single task at a given time; many I/O functions are not required because they are handled by the I/O nodes 111; many error diagnostic and recovery functions are not required because that is handled by control subsystem 102 or front-end nodes 103, and so forth. In the illustrated embodiment, operating system image 311 includes a simplified version of the Linux operating system, it being understood that other operating systems may be used, and further understood that it is not necessary that all nodes employ the same operating system.

Application code image 312 is desirably a copy of the application code being executed by compute node 112. Application code image 312 may include a complete copy of a computer program that is being executed by system 100, but where the program is very large and complex, it may be subdivided into portions that are executed by different respective compute nodes. Memory 302 further includes a call-return stack 315 for storing the states of procedures that must be returned to, which is shown separate from application code image 312, although it may be considered part of application code state data.

In addition, memory 302 typically includes one or more libraries, or Application Programming Interfaces (API's), such as library 316. Each library 316 provides a set of functions made available to application 312, and in some embodiments, each library 316 may be included within operating system image 311. As will become more apparent below, library 316 may also include multiple implementations of one or more of the supported functions, with each such implementation operating better or worse than other implementations depending upon various aspects of a current operating environment.

To implement algorithm selection consistent with the invention, the performance of one or more algorithms/rules 318 defined in library 316 is monitored by a performance collection tool 317 resident in memory 302. Tool 317 collects performance data associated with the execution of different algorithms functions in library 316, and it is this data that is used by the analysis and selection tools 123, 124 in determining optimal selection of algorithms.

It will be appreciated that, when executing in a virtual node mode (not shown), nodal memory 302 is subdivided into a respective separate, discrete memory subdivision, each including its own operating system image, application code image, application data structures, and call-return stacks required to support the user application sub-process being executed by the associated processor core. Since each node executes independently, and in virtual node mode, each processor core has its own nodal memory subdivision maintaining an independent state, and the application code images within the same node may be different from one another, not only in state data but in the executable code contained therein. Typically, in a massively parallel system, blocks of compute nodes are assigned to work on different user applications or different portions of a user application, and within a block all the compute nodes might be executing sub-processes which use a common application code instruction sequence. However, it is possible for every compute node 111 in system 100 to be executing the same instruction sequence, or for every compute node to be executing a different respective sequence using a different respective application code image.

In either coprocessor or virtual node operating mode, the entire addressable memory of each processor core 301 is typically included in the local nodal memory 302. Unlike certain computer architectures such as so-called non-uniform memory access (NUMA) systems, there is no global address space among the different compute nodes, and no capability of a processor in one node to address a location in another node. When operating in coprocessor mode, the entire nodal memory 302 is accessible by each processor core 301 in the compute node. When operating in virtual node mode, a single compute node acts as two "virtual" nodes. This means that a processor core 301 may only access memory locations in its own discrete memory subdivision.

While a system having certain types of nodes and certain inter-nodal communications structures is shown in FIGS. 1 and 2, and a typical node having two processor cores and various other structures is shown in FIG. 3, it should be understood that FIGS. 1-3 are intended only as a simplified example of one possible configuration of a massively parallel system for illustrative purposes, that the number and types of possible devices in such a configuration may vary, and that the system often includes additional devices not shown. In particular, the number of dimensions in a logical matrix, or lattice, might vary; and a system might be designed having only a single processor for each node, with a number of processors greater than two, and/or without any capability to switch between a coprocessor mode and a virtual node mode. While various system components have been described and shown at a high level, it should be understood that a typical computer system includes many other components not shown, which are not essential to an understanding of the present invention. Furthermore, various software entities are represented conceptually in FIGS. 1 and 3 as blocks or blocks within blocks of local memories 122 or 302. However, it will be understood that this representation is for illustrative purposes only, and that particular modules or data entities could be separate entities, or part of a common module or package of modules, and need not occupy contiguous addresses in local memory. Furthermore, although a certain number and type of software entities are shown in the conceptual representations of FIGS. 1 and 3, it will be understood that the actual number of such entities may vary and in particular, that in a complex computer system environment, the number and complexity of such entities is typically much larger.

It will also be appreciated that, while the illustrated embodiment utilizes a massively parallel computer system, the principles of the invention may be applied to other types of parallel, or multi-processor computer systems, whether implemented as multi-user or single-user computers, or in various other programmable electronic devices such as hand-held computers, set top boxes, mobile phones, etc.

The discussion hereinafter will focus on the specific routines utilized to implement the aforementioned functionality. The routines executed to implement the embodiments of the invention, whether implemented as part of an operating system or a specific application, component, program, object, module or sequence of instructions, will also be referred to herein as "implementations," "algorithms," "rules," "computer program code," or simply "program code." The computer program code typically comprises one or more instructions that are resident at various times in various memory and storage devices in a computer, and that, when read and executed by one or more processors in a computer, cause that computer to perform the steps necessary to execute steps or elements embodying the various aspects of the invention.

Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to physical recordable type media such as volatile and nonvolatile memory devices, floppy and other removable disks, hard disk drives, optical disks (e.g., CD-ROM's, DVD's, etc.), among others, and transmission type media such as digital and analog communication links.

In addition, various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Furthermore, it will be appreciated that the routines described herein may also be utilized in the deployment of services. In particular, program code that has been generated by the herein described techniques may be deployed to a parallel computer system, e.g., a massively parallel computer system, along with the various implementations of the function for which the program code has been generated. Such deployment may include manual or automated transmission of the program code to an operational computer system, and/or the manual or automated installation of such program code in an operational computer system.

Those skilled in the art will recognize that the exemplary environment illustrated in FIGS. 1-3 is not intended to limit the present invention. Indeed, those skilled in the art will recognize that other alternative hardware and/or software environments may be used without departing from the scope of the invention.

Figure 6:
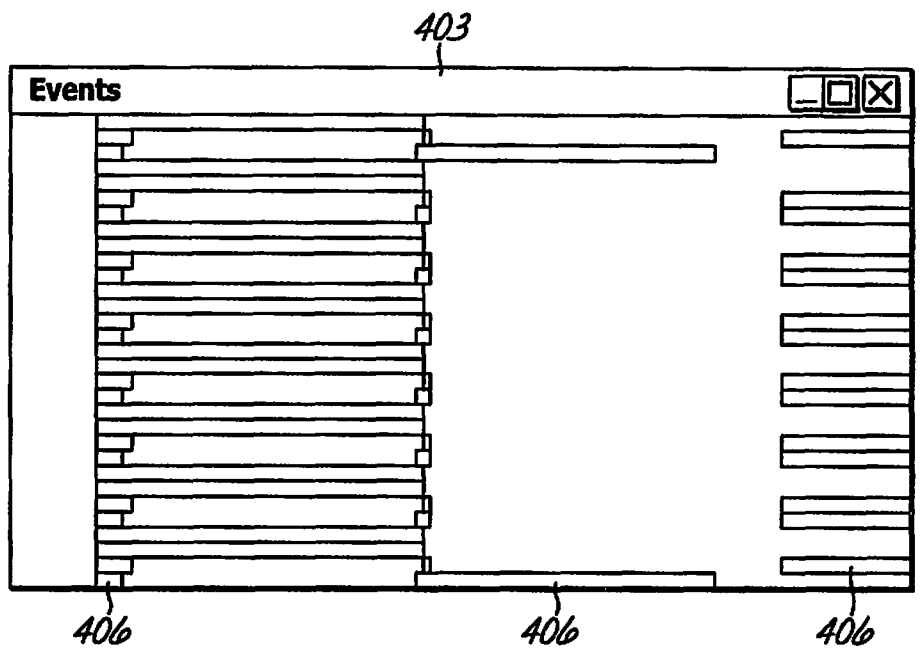
FIG. 6 is an exemplary report including actual performance data processed by the method steps of FIG. 4 in optimizing system performance.

FIG. 4 is a flowchart 400 having steps suitable for execution by the system 100 of FIG. 1 for automatically optimizing communication between the nodes of the lattice 201 shown in FIG. 2. At block 402 of FIG. 4, the program may receive actual performance data. The actual performance data may relate to one or more of link/nodal contention, cache miss data, and/or temperature-related data, among other examples of performance-related information capable of being monitored within a lattice system. For example, the actual performance data may be automatically generated by the performance collection program 317 in the form of MPI reports. FIG. 6 shows one such MPI-generated report 403 that regards message/communication delay times 406 between nodes for a given application. Such data may be accrued using performance counters and other known techniques. The actual performance data may be stored within memory 122 and analyzed, at blocks 408 and 410, respectively, of FIG. 4.

The program may analyze at block 410 the actual performance data. For example, embodiments may attempt to determine a pattern from the actual performance data. The program may use artificial intelligence, or fuzzy logic, to match the actual performance data to previously stored performance data. In this manner, the program may ascertain a pattern of contention. As is known by those skilled in the art, fuzzy logic generally comprises a form of algebra employing a range of values from "true" to "false" that is used in decision-making with imprecise data.

Figure 7:
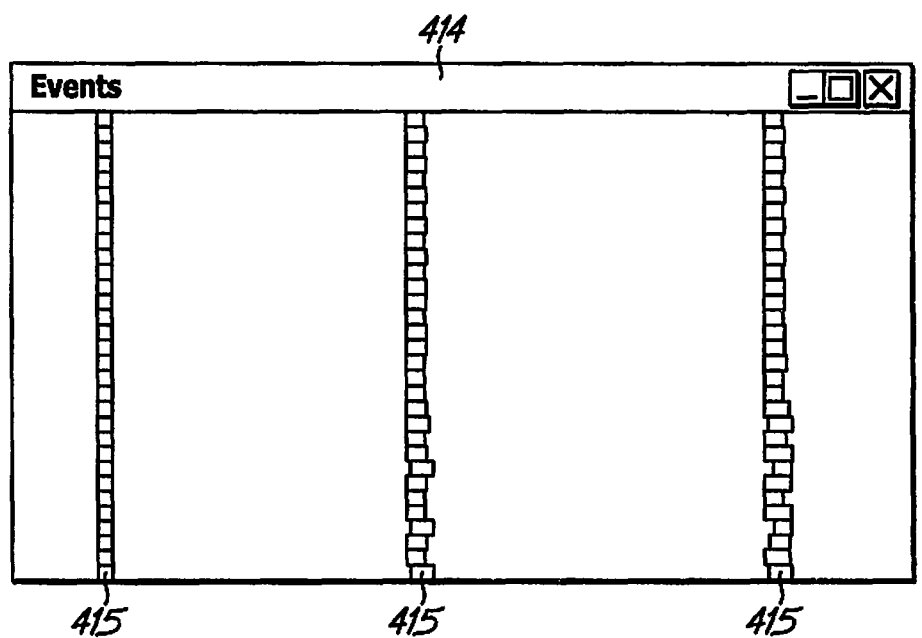
FIG. 7 is exemplary report including desired performance data processed by the method steps of FIG. 4 in optimizing system performance.

At block 412, the program may generate or otherwise determine desired performance data, or a desired performance pattern. The desired performance pattern may comprise a onetime goal of minimized network contention. FIG. 7 shows a MPI-type report 414 comprising a desired performance pattern regarding message/communication delay times 406 between nodes for the given application reported in FIG. 6. As can be seen in the report 414, the times 415 indicative of nodal/link contention have been dramatically reduced or eliminated.

At block 418 of the flowchart 400, the program may determine an algorithm suited to achieve the desired performance pattern based on the actual performance data. For instance, the selection tool 124 may dynamically evaluate the cause and effect of known algorithms and data sets to determine a best fit/match to the desired performance pattern.

To this end, embodiments consistent with the invention may employ programs known to determine/plot intermediate steps/points towards transitioning from the actual performance data to the desired performance pattern. For instance, Graphplan is a general-purpose programmatic planner for linear planner-style domains, based on ideas used in graph algorithms. Given a problem statement, Graphplan explicitly constructs and annotates a compact structure called a planning graph, in which a plan is a kind of flow of truth values through the graph. This graph has the property that useful information for constraining search can quickly be propagated through the graph as it is being built. Graphplan then exploits this information in the search for a plan.

At block 412, the algorithm may execute the new plan comprising the algorithm(s)/rules(s) 318 determined at block 418. Actual performance data generated using the new plan 318 executed at block 420 is typically gathered and received back at block 402, where the optimization process may continue.

FIG. 5 is a flowchart 430 executable by the system 100 of FIG. 1 and having steps configured to determine the algorithm/plan 318 that achieves the desired performance pattern. As such, the processes of FIG. 5 may have application within the embodiment shown in FIG. 4 at blocks 410, 412 and 418.

The steps of FIG. 5 may thus be said to expand upon an embodiment more generally discussed in the context of FIG. 4.

Turning more particularly to FIG. 5, the analyzer program 123 may determine at block 432 if a recognizable pattern exists for the actual performance data. If so, the program may determine at block 434 the algorithm having a known effect configured to achieve a result most similar to the desired pattern. For instance, poor communication times may be addressed by algorithm that more effectively synchronizes communication attempts, which may have the known effect of producing desired run times. In another example, an actual performance pattern that highlights temperature-related problems may prompt the automatic selection of an algorithm that includes a period of firing a periodic interrupt, which has the known effect of lowering temperature. An exemplary algorithm selected to address cache misses may include using row and/or column-bound multiplication applications, effectively reordering data. In any case, the selected algorithm(s) may be subsequently output at block 436 for implementation.

If the actual performance pattern alternatively cannot be identified at block 432, then the program may simulate all combinations of algorithms stored within the library 316. For instance, the program may run at block 438 each algorithm/rule 318 in the library 316 to individually analyze the results and to subsequently create a library of effects for the known algorithm(s). Synergistic effects may also be tracked and logged. The program may determine at block 440 the algorithm(s) having the result most similar to the preferred pattern. This algorithm(s) may then be stored at block 442 in the library 316 in association with the actual performance data, so that it might be used again in the future.

It will be appreciated that various modifications may be made to the illustrated embodiments without departing from the spirit and scope of the invention. For example, performance data may be used to identify additional performance enhancements and/or problems in a system. In addition, other code generation techniques may be utilized in the generation of selection program code. Moreover, any of the techniques described above as being utilized in connection with a code generation tool may be used in connection with an analysis tool, and vice versa. It will also be appreciated that the implementation of a code generation tool and an analysis tool to implement the herein described functionality would be well within the abilities of one of ordinary skill in the art having the benefit of the instant disclosure.

Other modifications will be apparent to one of ordinary skill in the art. Therefore, the invention lies in the claims hereinafter appended.

What is claimed is:

1. A method of optimizing performance of an application executed by a plurality of interconnected nodes comprising a massively parallel computer system using on-the-fly monitoring and performance adjustment, the method comprising:
   receiving actual performance data concerning the application executed by the plurality of interconnected nodes;
   analyzing the actual performance data to identify an actual performance pattern;
   determining a desired performance pattern for the application executed by the plurality of interconnected nodes in order to address a performance problem dynamically detected during execution of the application by the plurality of interconnected nodes; and
   selecting an algorithm from among a plurality of algorithms stored within a memory, the algorithm configured to achieve the desired performance pattern and address the performance problem based on the actual performance data, wherein selecting the algorithm includes dynamically evaluating causes and effects of known algorithms stored in a library of effects for known causal actions to achieve a best fit to the desired performance pattern;

wherein the method further comprises, in response to determining that the actual performance pattern is unidentified, sequencing through the plurality of algorithms to determine the algorithm configured to best achieve the desired performance pattern based on the actual performance data, wherein sequencing through the plurality of algorithms comprises simulating each of the plurality of algorithms and storing results associated with simulating each of the plurality of algorithms to grow the library with additional effects for known causal actions to address future performance problems, and wherein selecting the algorithm includes, in response to determining that the actual performance pattern is unidentified, selecting the algorithm from the stored results to address the performance problem.

2. The method of claim 1, wherein analyzing the actual performance data to identify the actual performance pattern further comprises correlating the actual performance data to the actual performance pattern identified from among a plurality of actual performance patterns stored within the memory.

3. The method of claim 1, wherein if the actual performance pattern is identified, further comprising using the actual performance pattern to select the algorithm.

4. The method of claim 1, further comprising storing within the memory the algorithm in association with the actual performance data.

5. The method of claim 1, wherein selecting the algorithm further comprises using fuzzy logic.

6. The method of claim 1, further comprising storing the actual performance data within the memory.

7. The method of claim 1, further comprising retrieving the algorithm from the memory.

8. The method of claim 1, further comprising executing the algorithm.

9. An apparatus, comprising:
a processor;
a memory storing a plurality of algorithms configured to optimize performance of various applications executing in a massively parallel computer system of the type including a plurality of interconnected nodes; and
program code configured to be executed by the processor to optimize performance of an application using on-the-fly monitoring and performance adjustment by receiving actual performance data relating to the execution of the application by the plurality of interconnected nodes; analyzing the actual performance data to determine an actual performance pattern; determining a desired performance pattern for the application executed by the plurality of interconnected nodes in order to address a performance problem dynamically detected during execution of the application by the plurality of interconnected nodes; and selecting an algorithm from among a plurality of algorithms stored within the memory, the algorithm configured to achieve the desired performance pattern and address the performance problem based on the actual performance data, wherein selecting the algorithm includes dynamically evaluating causes and effects of known algorithms stored in a library of effects for known causal actions to achieve a best fit to the desired performance pattern;

wherein the program code is configured to, in response to determining that the actual performance pattern is unidentified, initiate sequencing through the plurality of algorithms to determine the algorithm configured to best achieve the desired performance pattern based on the actual performance data, wherein the program code is configured to initiate sequencing through the plurality of algorithms by simulating each of the plurality of algorithms and storing results associated with simulating each of the plurality of algorithms to grow the library with additional effects for known causal actions to address future performance problems, and wherein the program code is configured to select the algorithm by, in response to determining that the actual performance pattern is unidentified, selecting the algorithm from the stored results to address the performance problem.

10. The apparatus of claim 9, wherein the plurality of interconnected nodes further comprises a lattice of interconnected nodes.

11. The apparatus of claim 9, wherein the processor executes the program code to initiate correlating the actual performance data to the actual performance pattern from among a plurality of actual performance patterns stored within the memory.

12. The apparatus of claim 9, wherein if the actual performance pattern is identified, the processor executes the program code to initiate selecting the algorithm using the actual performance pattern.

13. The apparatus of claim 9, wherein the processor executes the program code to initiate storage of the algorithm within the memory in association with the actual performance data.

14. The apparatus of claim 9, wherein the program code includes fuzzy logic.

15. The apparatus of claim 9, wherein the processor executes the program code to initiate storage of the actual performance data within the memory.

16. The apparatus of claim 9, wherein the processor executes the program code to initiate retrieval of the algorithm from the memory.

17. The apparatus of claim 9, wherein the processor executes the program code to initiate execution of the algorithm.

18. A program product, comprising:
program code configured to optimize performance of an application executed by a plurality of interconnected nodes comprising a massively parallel computer system using on-the-fly monitoring and performance adjustment by receiving actual performance data concerning the application executed by the plurality of interconnected nodes; analyzing the actual performance data to determine an actual performance pattern; determining a desired performance pattern for the application executed by the plurality of interconnected nodes in order to address a performance problem dynamically detected during execution of the application by the plurality of interconnected nodes; and selecting an algorithm from among a plurality of algorithms stored within the memory, the algorithm configured to achieve the desired performance pattern and address the performance problem based on the actual performance data, wherein selecting the algorithm includes dynamically evaluating causes and effects of known algorithms stored in a library of effects for known causal actions to achieve a best fit to the desired performance pattern; and
a physical recordable computer readable medium storing the program code;
wherein the program code is configured to, in response to determining that the actual performance pattern is unidentified, initiate sequencing through the plurality of algorithms to determine the algorithm configured to best achieve the desired performance pattern based on the actual performance data, wherein the program code is configured to initiate sequencing through the plurality of algorithms by simulating each of the plurality of algorithms and storing results associated with simulating each of the plurality of algorithms to grow the library with additional effects for known causal actions to address future performance problems, and wherein the program code is configured to select the algorithm by, in response to determining that the actual performance pattern is unidentified, selecting the algorithm from the stored results to address the performance problem.

\* \* \* \* \*